J. D. REIFSNYDER, W. A. WEIGHTMAN & E. G. RIDER.
AUTOMATIC BLANK FEEDING, GUMMING, AND WRAPPING MACHINE.
APPLICATION FILED JUNE 15, 1917.
1,282,948.
Patented Oct. 29, 1918.
8 SHEETS—SHEET 2.
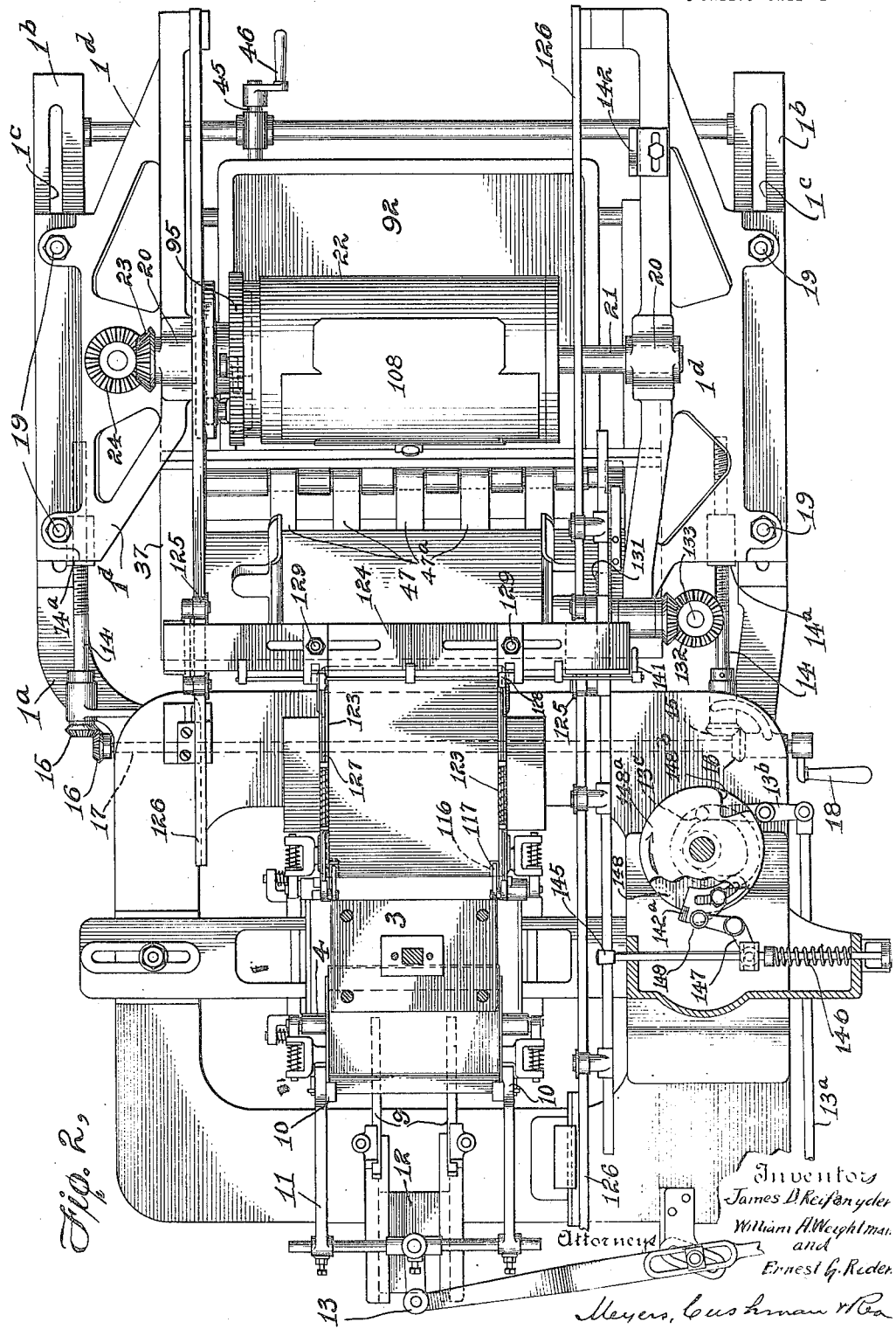

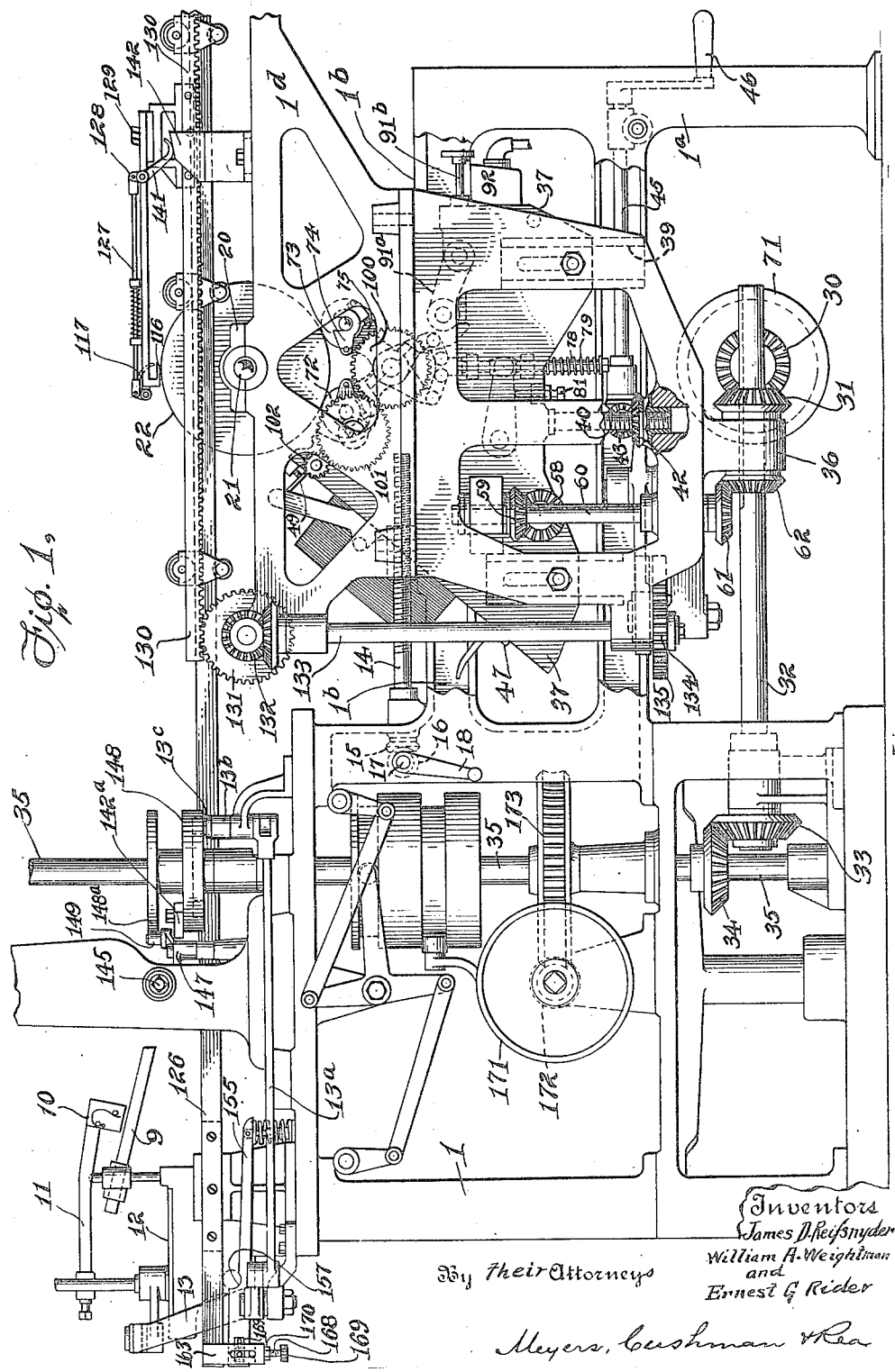

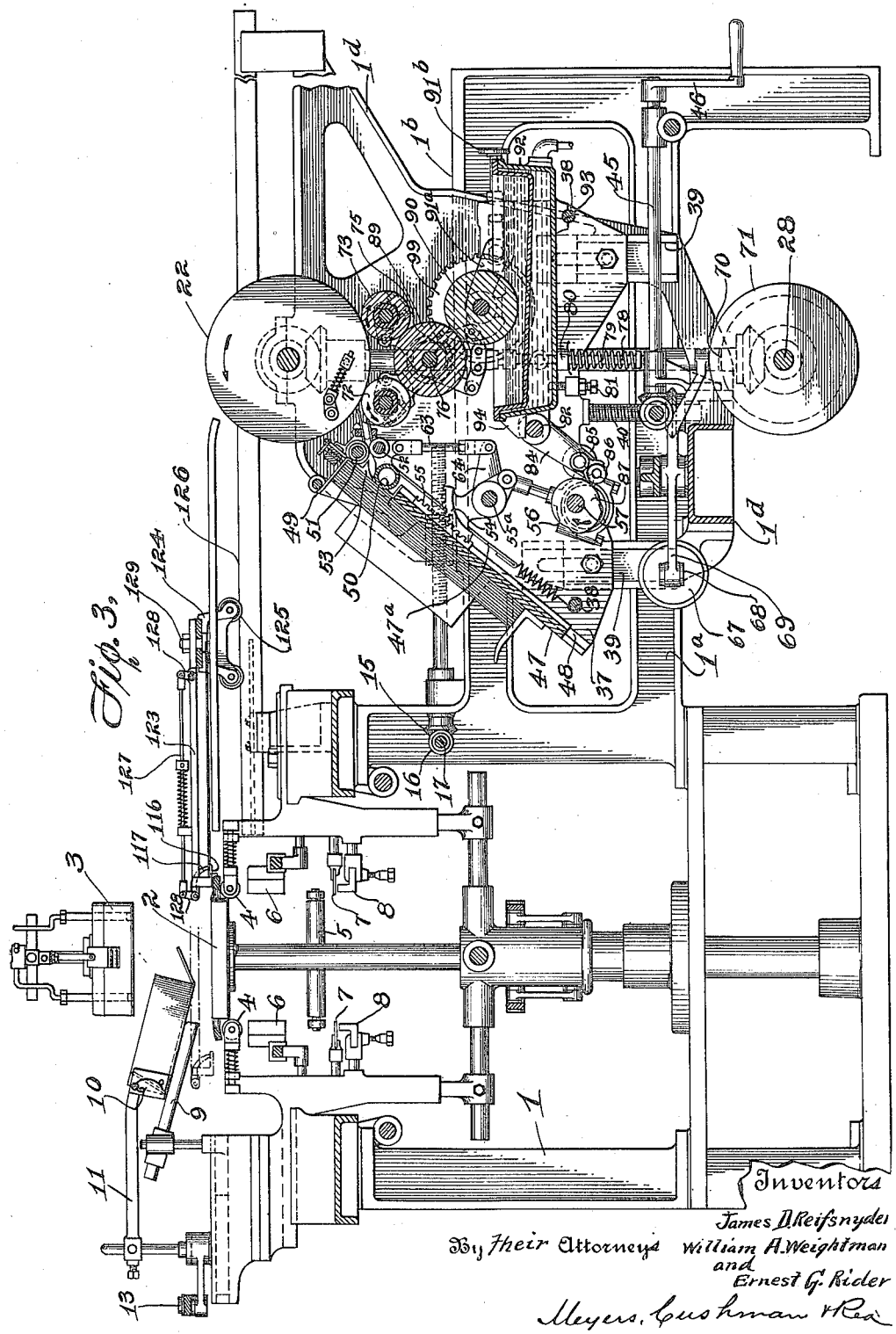

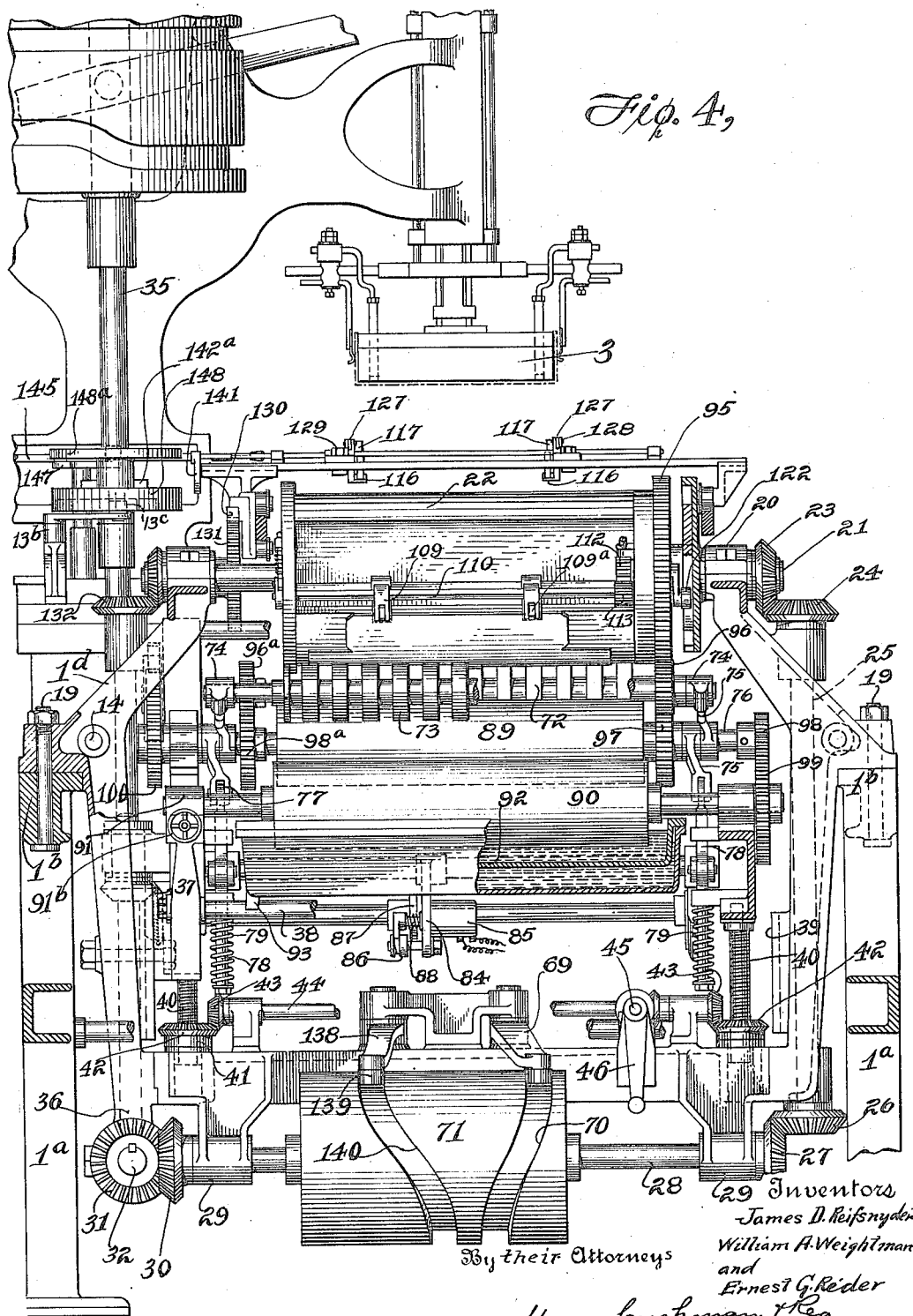

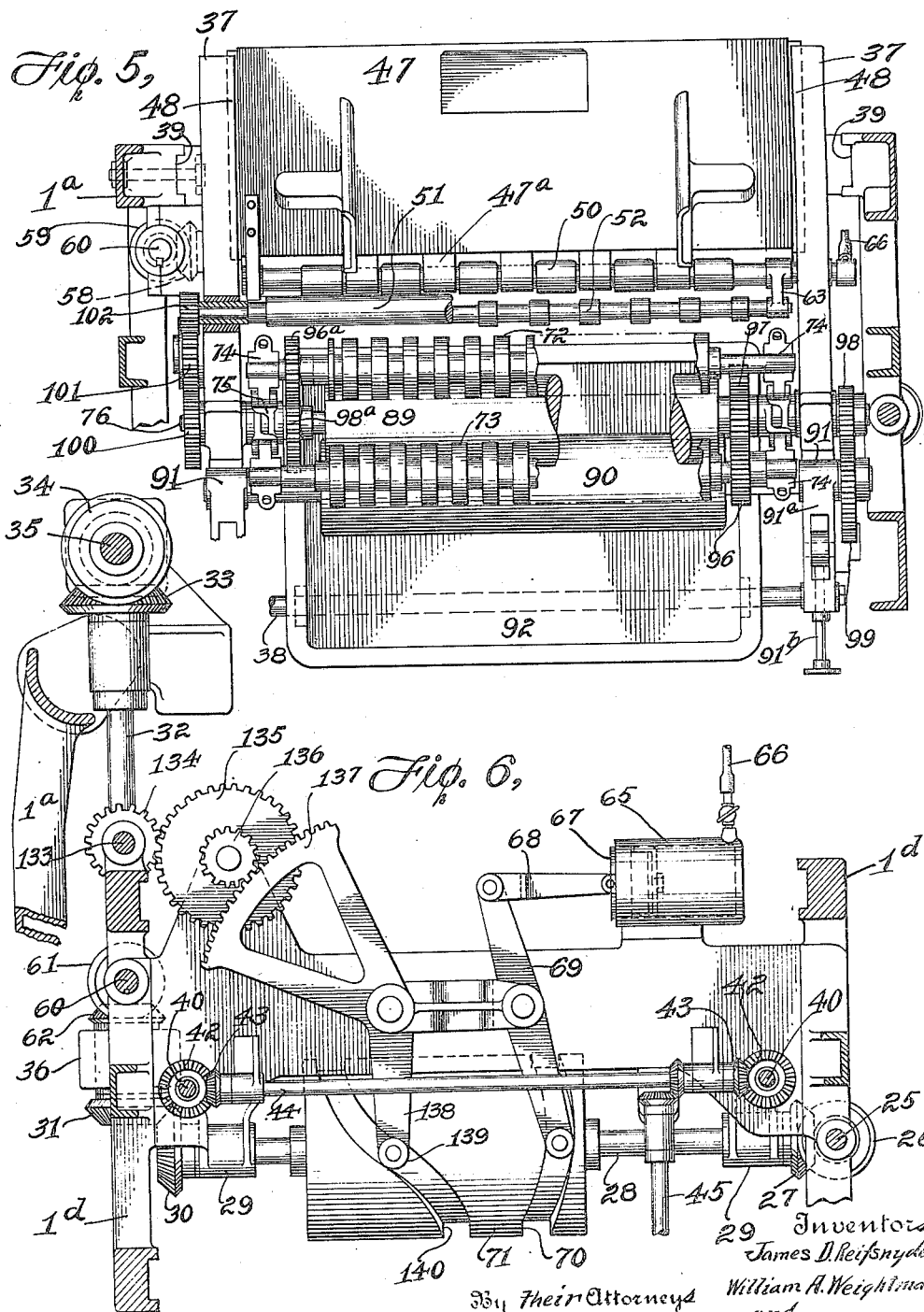

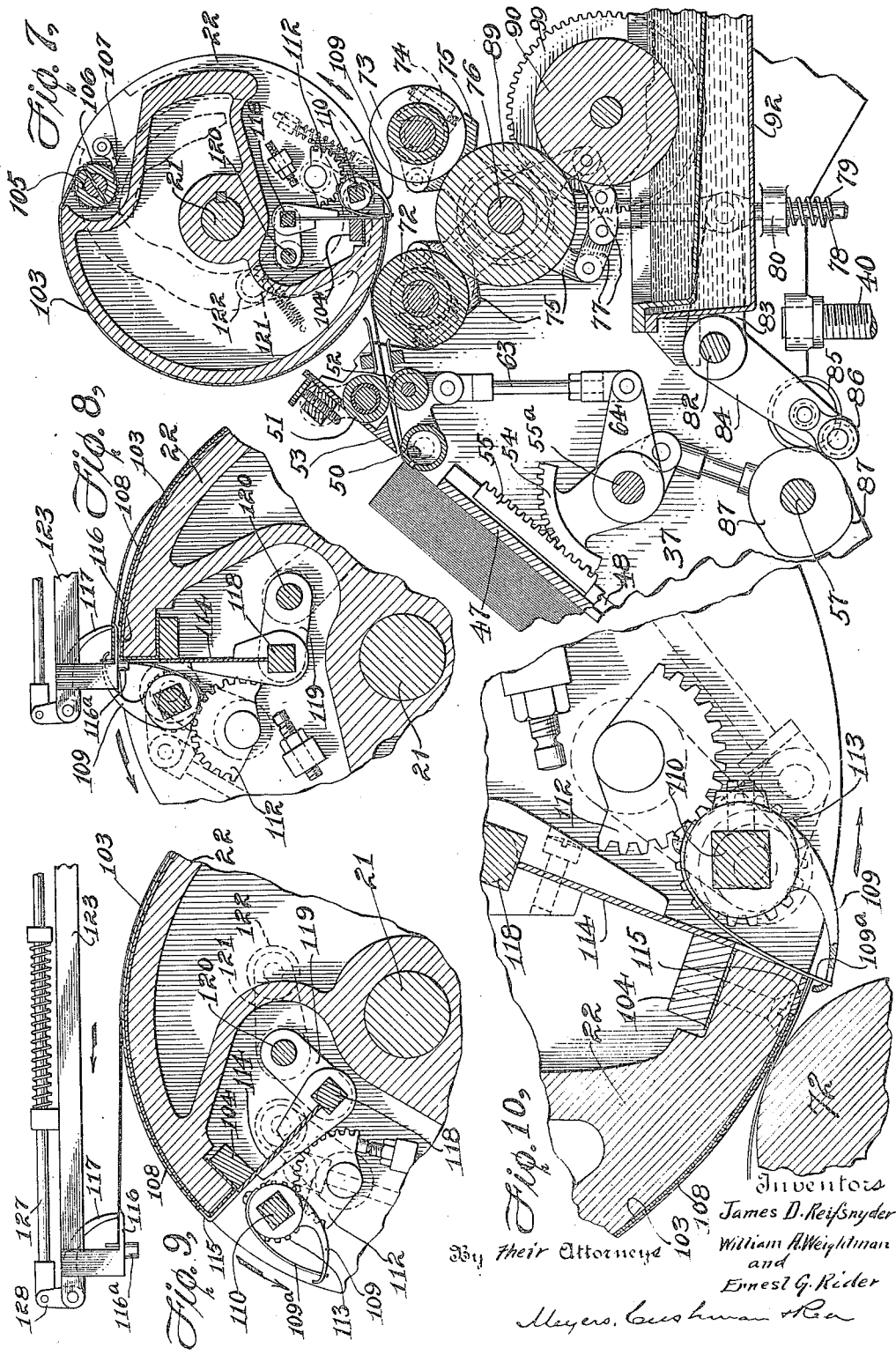

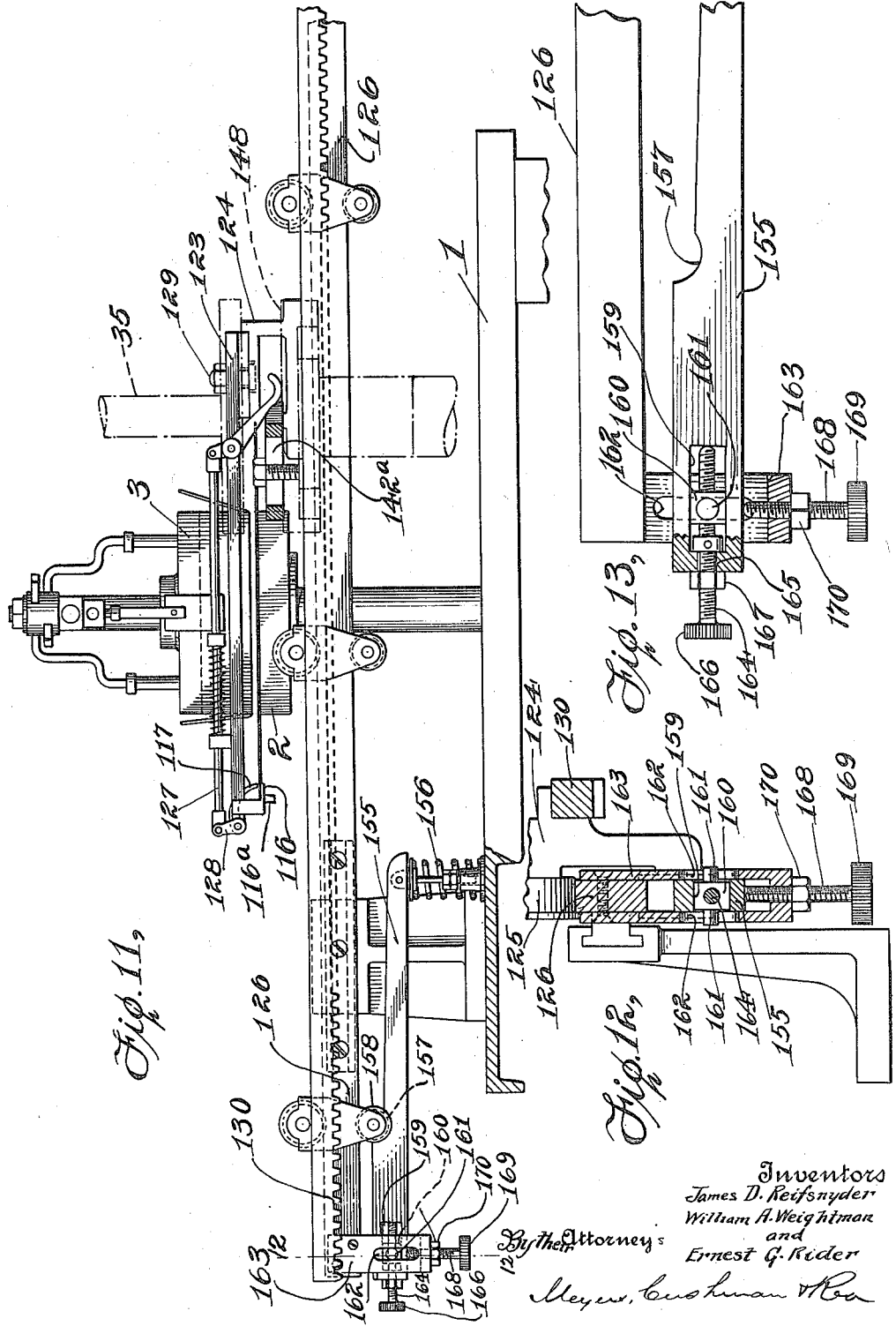

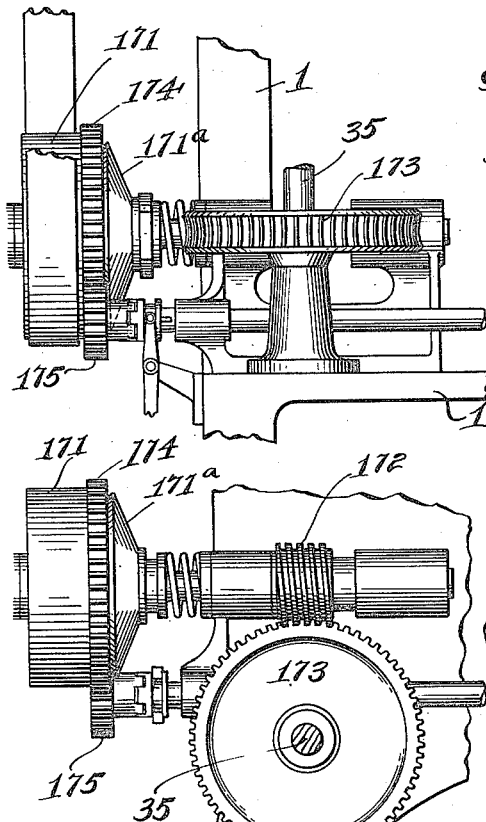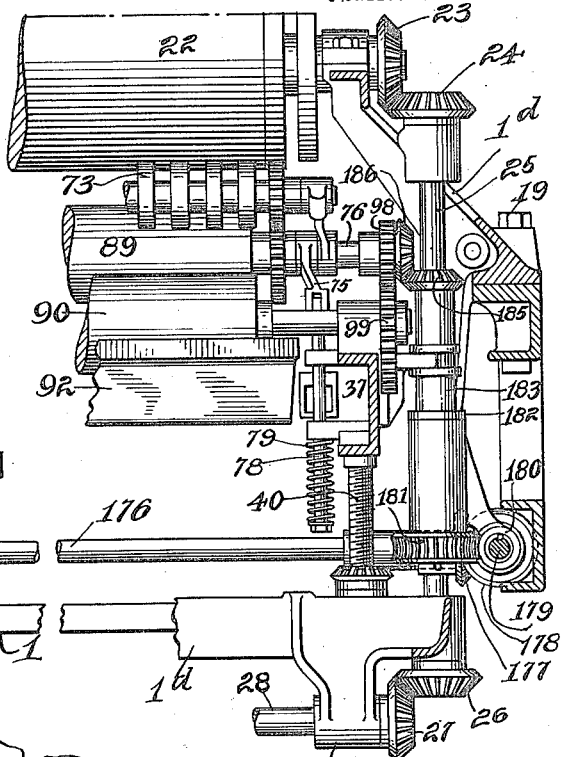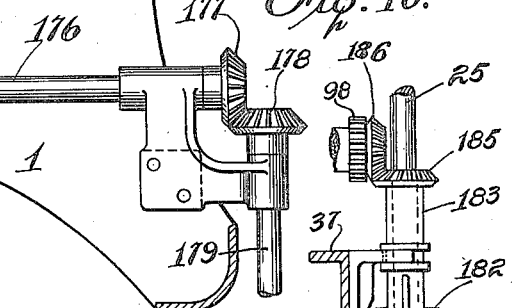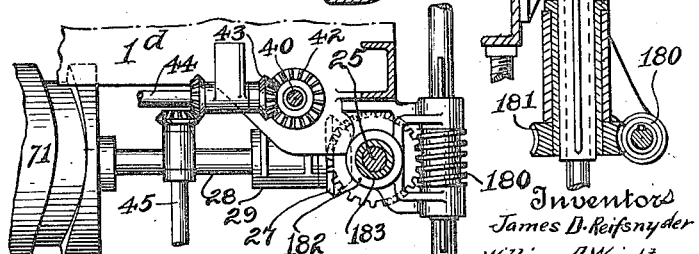

UNITED STATES PATENT OFFICE.

JAMES D. REIFSNYDER, WILLIAM A. WEIGHTMAN, AND ERNEST G. RIDER, OF PHILADELPHIA, PENNSYLVANIA, ASSIGNORS TO STOKES & SMITH COMPANY, OF PHILADELPHIA, PENNSYLVANIA, A CORPORATION OF PENNSYLVANIA.

AUTOMATIC BLANK FEEDING, GUMMING, AND WRAPPING MACHINE.

1,282,948.           Specification of Letters Patent.     Patented Oct. 29, 1918.

Application filed June 15, 1917.   Serial No. 174,921.

*To all whom it may concern:*

Be it known that we, JAMES D. REIFSNYDER, WILLIAM A. WEIGHTMAN, and ERNEST G. RIDER, citizens of the United States, residing at Philadelphia, in the county of Philadelphia and State of Pennsylvania, have invented certain new and useful Improvements in Automatic Blank Feeding, Gumming, and Wrapping Machines, of which the following is a specification.

Our present invention relates generally to box covering and package wrapping machines of the automatic type and has to do more particularly with mechanism for automatically feeding, gumming and transporting adhesively coated wrapper blanks to the covering or wrapping mechanism.

While we have shown our improvements as associated with a box covering or package wrapping machine of a known type wherein a platen and a coöperating box form or plunger are employed, we do not wish to be understood as limiting ourselves in this particular as obviously the means for feeding, gumming and transporting the adhesively coated blanks may be associated with other forms of mechanism for applying the wrapper blanks about a box or package.

The prime object of the present invention is to provide a comparatively simple form of mechanism for automatically feeding, gumming and transporting wrapper blanks in accurately registered association with the instrumentalities for folding and adherently affixing the blanks to the box or package to be wrapped or covered, the wrapper transporting means being so constructed, in the instance shown, that the adhesively coated wrapper blanks will be delivered, with the adhesively coated face uppermost, over a platen and in proper registered position to receive the box or package so that as the plunger or form block forces or carries the box or package through the wrapper applying instrumentalities the latter will operate to properly fold the wrapper blank in a smooth and accurate manner about and adherently affix the same to the box or package.

Another object of the invention is to provide an automatic wrapper-blank feeding, gumming and transporting means that may be built as a separate unit and attached to already existing box covering or package wrapping machines, or said unit may be formed as a part of such machines when initially constructed.

Another object of the invention is to provide an automatic blank feeding, wrapping and transporting means that may be properly adjusted to permit the feeding, gumming and transporting of wrapper blanks of different sizes.

Another object of the invention is to provide a novel relative arrangement of the several groups of mechanisms, namely, the wrapping, gumming and blank selecting and feeding mechanisms, whereby a more compact organization results, and a more rapid coating and delivery of the gummed blanks is secured, thus making it possible to increase the speed and output of the machine as well as saving floor space.

A further object of the invention is to provide means for imparting an initial advancing movement to the wrapper-blank transporting carriage and its grippers, directly from the blank-supporting platen during rotation thereof, in order to provide for accuracy and uniformity of the gripping action of such grippers upon the blanks and thereby insure a more perfect register of the blanks at the point of delivery.

A further object of the invention is to provide means associated with the blank-supporting platen for lifting the front or advancing end of the wrapper blanks supported thereon at substantially the moment when the grippers of the wrapper blank transporting carriage come to position to take hold of the blanks whereby to insure accuracy of the gripping operation of such grippers.

A further object of the invention is to provide a combined buffer and carriage stopping means arranged at the delivery end of the blank-supporting carriage to absorb shocks of the carriage as it approaches its final delivery position and thereby insure proper positioning of the blanks relatively to the platen of the wrapping mechanism to secure accurate register of the wrappers and the boxes or packages to be fed thereunto.

In machines of the automatic and semi-automatic type wherein provision is made for applying glue or adhesive, either hot or cold, to wrapper blanks fed to the machine, it often occurs that for one reason or another it becomes necessary to stop the operation of the wrapper-applying instrumentalities which, in such machines as now constructed also causes a cessation in the operation of the adhesive applying means including the adhesive applying rolls. In machines of this class where such cessation occurs in the operation of a machine as a whole, and the machine remains at rest for any considerable period of time, unless the adhesive applying rolls are removed and cleaned, before the machine is again started up, the adhesive will become hard and dry on the surface of the rolls with the result that defective gluing will take place upon the machine being again put in operation.

Another object of the present invention, therefore, is to avoid this stated difficulty by providing means for causing the adhesive applying mechanism to continue in operation during such times as when the wrapper applying instrumentalities may be at rest, to the end that the adhesive will not become dry or caked upon the adhesive applying rolls.

The invention has in view other more or less important objects, all of which will appear in the detailed description which follows.

A preferred embodiment of the invention is illustrated in the accompanying drawings, wherein, Figure 1 is a side elevation of a complete machine constructed in accordance with the invention.

Fig. 2 is a top plan view.

Fig. 3 is a part elevation and part vertical section, taken longitudinally through the machine.

Fig. 4 is a part elevation and part vertical section taken transversely through the wrapper blank adhesive applying means.

Fig. 5 is a detailed plan, partly in section, of a portion of the glue-applying mechanism.

Fig. 6 is a detailed plan view, partly in section, showing the operating mechanism for reciprocating the wrapper transporting carriage and showing also a portion of the mechanism for adjusting the position of the adhesive applying means.

Fig. 7 is a vertical section of a portion of the wrapper blank feeding means shown in association with the adhesive applying rollers and the coöperating blank-supporting platen.

Fig. 8 is a transverse vertical section of a portion of the blank-supporting platen and one of the grippers of the blank transporting means, the views illustrating the position of the gripper in the act of taking the adhesively coated wrapper from the platen.

Fig. 9 is a somewhat similar view showing one of the grippers in the act of transporting the adhesively coated wrapper to the box or package wrapping instrumentalities.

Fig. 10 is a transverse sectional view showing the position of the gripper in the act of gripping the wrapper blank as it passes over the first one of the two glue-applying rollers.

Fig. 11 is a detail side elevation of a portion of the blank transporting carriage, showing the same at the extreme end of its delivery position and showing also the buffer stop in coöperative relation with the carriage.

Fig. 12 is a transverse vertical section taken on the line x—x of Fig. 11.

Fig. 13 is a side elevation of the rear end portion of the carriage buffer stop.

Fig. 14 is an elevation partly in section of one form of means for driving the glue-applying rollers independently of the driving means for the wrapper applying instrumentalities.

Fig. 15 is a plan view of the driving means illustrated in Fig. 14.

Fig. 16 is a detail view partly in section of a part of the driving means.

According to the plan of operation of the machine the wrapper blanks are arranged in pack form upon a suitable support forming a part of the automatic wrapper feeding mechanism. The wrapper blanks which are to be adhesively coated on one face are fed forward singly from the bottom of the pack over one of a pair of glue-applying rollers having spaced glue-applying faces, the glue-applying faces of one roller being opposite the spaces between the faces of the other roller so that the wrapper-blanks when drawn over the two glue-applying rollers will have a coating of adhesive applied over substantially the entire area of one face thereof. A rotary blank supporting platen is coöperatively associated with the two glue-applying rollers, the platen having a gripper or grippers which operate to grasp the forward end of the wrapper blanks as they are successively fed to the rollers, the gripping action taking place just after the forward edge of each wrapper blank has passed over the first one of the two glue-applying rollers, the wrapper blanks receiving the coating of adhesive during rotation of the blank supporting platen.

During rotation of the platen with the adhesively coated wrapper blank supported thereon, the grippers of the wrapper transporting device are brought into coöperative association with the forward edge of the blank so that said edge is released from the grippers of the platen and immediately gripped by the grippers of the wrapper transporting device, the latter then operating to transport the adhesively coated blank bodily to the wrapper applying instrumentalities, the wrapper being released when it is properly delivered in registered position, whereupon the wrapper transporting device returns to receive another wrapper. These operations are carried on automatically and successively to the end that an entirely automatic machine is provided for feeding the wrapper blanks, applying adhesive to a face thereof, transporting the wrapper blanks in proper position with relation to the box covering or wrapping instrumentalities and the wrapper then applied to the box or package.

As the particular box covering or package wrapping machine with which we have shown our improvements associated is of known construction, it will be necessary only to refer to this part of the machine in a brief way, and to this end we refer more particularly to Fig. 3, wherein the reference numeral 1 designates generally the frame of the machine; 2 the downwardly movable wrapper supporting platen; 3 the vertically reciprocating box supporting form or package advancing plunger; 4 and 5 the two sets of wrapper applying instrumentalities shown in the form of rollers; 6 the two sets of end turn-in wings; 7 the two sets of edge turn-in fingers and 8 the two sets of pressure blocks for imparting pressure to the outer walls of the package or box during the operation of the edge turn-in fingers. The parts referred to constitute what is termed herein the wrapper applying instrumentalities and may be of any preferred construction, the showing here being only by way of illustration. It is to be understood of course that the vertically yielding blank supporting platen 2, and the box form or plunger 3, are interchangeably supported as is usual in machines of this type in order that boxes or packages of different sizes may be curved or wrapped as the case may be. Likewise the wrapper applying instrumentalities are adjustably mounted as usual.

There is also shown associated with the machine, as when the machine is of the type for applying a wrapper about a box shell, a mechanism for automatically feeding the box shells to and applying them directly upon the box form, this means being more clearly shown in Figs. 1, 2 and 3, and comprises generally a pair of inclined supporting bars 9 for the box shells, a reciprocating box shell supporting and advancing mechanism including a pair of box shell supporting members 10, each mounted upon a rod 11 carried by a reciprocating carriage 12, the carriage being reciprocated by any suitable form of means such as the lever 13 connected by link 13$^a$, to a short lever 13$^b$, having a roller at one end lying in the groove of a cam 13$^c$, all as more clearly shown in Figs. 1 and 2.

As this automatic box shell feeding mechanism forms the subject matter of a separate application for patent filed by Ernest G. Rider, November 15th, 1916, Serial No. 131,444, one of the joint applicants in this case, it need not be described herein in greater detail, it being understood that any form of automatic box feeding mechanism may be employed in association with the other features of the machine when a completely organized automatic machine is to be provided.

The blank feeding, gumming and transporting mechanism is supported upon a supplemental main frame 1$^a$, which, in the instance shown, is arranged to one side of and attached in any suitable way to the main frame 1 of the wrapping or covering machine. This supplemental main frame is provided with a pair of spaced apart top plates or rails 1$^b$ each having therethrough longitudinal slots 1$^c$ as more clearly shown in Fig. 2. Upon the said top plates or rails 1$^b$ of the supplemental main frame is mounted a longitudinally adjustable carrier frame 1$^d$, said carrier frame being adjustable toward and from the wrapper applying instrumentalities in order to accommodate blanks of different sizes. Adjustment of the frame is effected by means of screws 14 working in threaded nuts 14$^a$ carried by the frame 1$^b$, said screws 14 each having a beveled gear 15 at one end, said beveled gears being in mesh with similar beveled gears 16 carried by a shaft 17, the latter being provided at one end with a crank handle 18 by means of which the shaft 17 may be rotated in either direction in order to transmit motion to the screws 14 and thus adjust the carrier frame 1$^d$ toward and from the wrapper applying instrumentalities. When the frame has been brought to proper adjusted position, it may be securely held in such position by means of the screw bolts 19 which pass through the slots 1$^c$ in the top rails 1$^b$ of the supplemental main frame, all as more clearly shown in Fig. 2.

Journaled for rotation in suitable bearings 20, in the upper part of the carrier frame 1$^d$ is a shaft 21, upon which is mounted a blank-supporting platen having the form of a segmental drum 22, which is driven through bevel gears 23, and 24, the latter being mounted upon a vertical shaft 25, having a bevel gear 26 at its lower end all as more clearly shown in Fig. 4. The bevel gear 26, is driven by a similar gear 27, mounted upon the transverse shaft 28, journaled in suitable bearings 29, carried by the carrier frame 1$^d$ and said transverse shaft is driven by bevel gears 30, 31, the latter of which is mounted upon the end of a longitudinal shaft 32, having a bevel gear 33, at its forward end which in turn meshes with a bevel gear 34, mounted upon the vertically extending main drive shaft 35, which forms a part of the driving means for the wrapper applying mechanism as more clearly shown in Fig. 1. In order to permit of the carrier frame 1ᵈ being adjusted toward and from the wrapper applying mechanism without interfering with the drive gear connections between the transverse shaft 28, and the longitudinal shaft 32, the gear 31 is splined on said shaft 32, as more clearly shown in Fig. 1, where it will be seen that one end of shaft 32 is journaled in a bearing 36, formed as a part of the carrier frame 1ᵈ.

Supported for vertical adjustment upon the carrier frame 1ᵈ is an auxiliary frame, the outline of which will be clearly seen in Fig. 1, and other portions of which are shown in Figs. 3 and 4. This auxiliary frame which is made up of the two side frame members or plates 37 and tie-rods 38, is mounted for vertical adjustment in guides 39, Figs. 1, 3, 4 and 5. Adjustment is effected by means of screw rods 40, which pass through threaded nuts, 41, each carrying a bevel gear 42, with which mesh other bevel gears 43, carried by a transverse shaft 44, the latter being geared to an operating shaft 45, having a crank handle 46 at one end, all as more clearly shown in Figs. 1 and 3. By manipulating the crank handle 46, it will be apparent that the auxiliary frame may be raised and lowered bodily toward and from the blank-supporting platen 22, for a purpose presently to appear.

It will be seen from the foregoing that the frame part of the blank feeding, gumming and transporting mechanism is made up of three independent frame members, namely the supplemental main frame 1ᵃ, the longitudinally adjustable carrier frame 1ᵈ, and the vertically adjustable auxiliary frame made up of the two side plates 37, the said carrier and auxiliary frames being adjustable relatively to one another at right angles and the two said frames being adjustable bodily or as a unit upon the supplemental main frame 1ᵃ, in directions toward and from the wrapper applying mechanism.

The vertically adjustable auxiliary frame supports the automatic wrapper feeding mechanism and the gumming or adhesive applying mechanism, and these parts will now be described in detail, although we do not wish to be understood as limiting ourselves to the particular construction shown, as we are aware that changes or additions may be made without departing from the spirit of the invention.

The wrapper blanks which are usually of the "cornered" type are supported in pack form upon an upwardly inclined table 47, and upon tapes 47ᵃ, the table being mounted to reciprocate between guides 48, Fig. 3, toward and from a front stop 49. In advance of the upper end of the table 47, there is mounted an oscillating suction picker roll 50, which operates through a suction aperture or apertures to separate the bottom blank from the pack during each forward reciprocation of the table, the separated blanks being successively projected between a pair of feed rolls 51, 52, located just in advance of the suction roll 50, and being guided toward said feed rolls by means of a finger 53, as more clearly shown in Figs. 3 and 7. The table 47 is reciprocated by means of an oscillating gear segment 54, meshing with a rack 55, upon the underside of the table, said segment being mounted upon an oscillatory shaft 55ᵃ, which is oscillated by means of a strap eccentric 56, mounted upon a shaft 57, journaled in the auxiliary frame. The shaft 57, has a bevel gear 58 at one end, which meshes with a similar gear 59, splined upon a vertical shaft 60, the latter carrying a bevel gear 61, at its lower end which meshes with a similar gear 62, splined upon the longitudinal shaft 32, all as more clearly shown in Fig. 1. By reason of the splined connection between the gear 59 and shaft 60, the auxiliary frame may be raised or lowered without interfering with the driving connections.

The feed roll 52, is mounted to move away from its companion feed roll 51 at the moment the suction picker roll 50 advances a blank between the rolls and said roll 52, is then moved up in order to grip the blank between the two feed rolls whereby to feed the blank forward to the gumming mechanism presently to be described. The feed roll 52, is moved in the manner described and in timed relation with the reciprocations of the feed table, by means of a link 63, jointed to an arm 64, secured to the oscillatory shaft 55ᵃ.

Air is exhausted from the suction roll 50, by means of a mechanically operated pump 65, having a flexible tube connection 66, with said roll at any suitable point. The piston 67, of the pump is operated by means of a link 68, jointed to a pivoted lever 69, having a roller at one end that runs in a cam groove 70, formed in the periphery of a drum 71, mounted upon the transverse shaft 28, all as more clearly shown in Figs. 4 and 6. Any suitable form of relief valve may be employed in association with the suction roll 50, to break the suction action in the roll after the latter has operated to separate and initially advance the sheets from the pack. As such valves are old in the art and their operation well understood, it is not necessary to illustrate and describe their action further.

The mechanism employed for applying a surface coating of adhesive to the blanks as they are fed forward from the pack consists in the instance shown of a pair of spaced parallel glue-applying rollers 72, and 73, each comprising a plurality of spaced apart glue-applying faces, the faces of one of the rollers being located opposite the spaces between the faces of the other roller, in such a manner that when a blank is drawn over the two rollers it will receive a coating of glue over substantially the entire face thereof. It will be understood however, that the glue-applying faces may be otherwise arranged so that the blank will receive only stripes or spots of adhesive. Such an arrangement will be so obvious from the disclosure herein that no further reference or illustration is considered necessary.

The glue-applying rollers 72 and 73 as more clearly shown in Figs. 3 and 7 are removably journaled at their ends in open bearings 74 each bearing being formed upon the end of a pivoted arm 75, there being two pairs of said arms 75, the arms of each pair crossing each other scissors-like and being pivoted to a shaft 76. The arrangement of the two pairs of arms is such that by a swinging movement thereof toward and from each other, the glue-applying rollers 72 and 73 may be brought toward and from the surface of the blank-supporting platen 22 for a purpose presently to appear. The lower ends of the two pairs of arms 75 are connected by toggle links 77 to a vertically movable rod 78 which rod is normally urged downwardly by a spring 79 coiled about the lower end thereof and one end of which spring bears against an apertured lug 80 through which the rod 78 passes, the lug being formed as a part of the auxiliary frame. Vertical movement in a downward direction of the rod 78 may be limited by means of a stop screw 81 coöperating with the arm 83 to which the rod 78 is pivoted, also shown in Figs. 1 and 3.

One purpose of mounting the glue-applying rollers 72 and 73 upon the swinging arms is to render the rolls capable of being moved toward and from the surface of the blank-supporting platen so that the glue-applying faces of the rolls will not contact with and thus impart glue to the surface of the platen when no blank is fed thereto by the blank-feeding means. Mechanism is provided for automatically rocking the arms on their pivot 76 to simultaneously move the two rolls away from each other and away from the surface of the platen when no sheet is fed and this mechanism, in the instance shown, consists of a bell-crank lever pivoted at 82, the arm 83 of which is linked to the vertically moving rod 78 and the arm 84 of which carries a solenoid magnet 85. The core of the solenoid carries a roller 86 adapted through the solenoid action on its core, to be brought into and out of the path of rotation of a cam 87 mounted upon the shaft 57 as more clearly shown in Fig. 3.

The roller 86 is normally held out of the path of movement of the cam by means of a coil spring 88 as shown in Fig. 4. The solenoid is in circuit with the two blank feed rolls 51 and 52 and the arrangement and operation of parts are such that if the rolls are allowed to contact with one another when no sheet is fed therebetween the circuit will be completed through the solenoid 85 which will cause its armature core to move the roller 86 into the path of movement of the cam 87 so that the cam acting upon the roller 86 will operate to rock the bell crank lever in such a way as to cause the rod 78 to move upwardly and through its toggle connection with the roller carrying arms 75 cause the upper ends thereof together with their rollers to move outwardly a sufficient distance to prevent surface contact of the glue-applying faces of the rolls with the peripheral surface of the blank-supporting platen. Whenever a sheet is being properly fed between the feeding rolls 51 and 52 no circuit will be completed to the solenoid 85 and the roller 86 will therefore, by reason of action of the spring 88 be held normally out of the path of rotation of the cam 87 so that the glue-applying faces of the rolls 72 and 73 will be properly positioned to apply a surface coating of glue to a blank supported upon the blank-supporting platen as will presently appear.

The glue-applying rolls 72 and 73 receive a surface coating of glue from a distributer roll 89 located therebelow and in such a position that both of the rolls 72 and 73 rotate in surface contact therewith. The distributer roll 89 receives its glue from a supply roll 90 journaled in slidably adjustable bearings 91 carried by the swinging arms 91$^a$ and receives its glue from a glue tank 92. The glue tank may be of the steam heated type if desired, as more clearly shown in Fig. 3. The tank is removably supported between the two side plates 37 of the auxiliary frame so that it can be readily removed for cleaning purposes. One manner of removably supporting the glue tank is to have it rest at one end upon one of the cross rods 93 of the auxiliary frame and its other end provided with lugs 94 which rest upon the shaft 82 about which the bell crank lever 84 is pivoted. The slidable bearings in which the supply roll 90 is mounted may be adjusted so as to increase or decrease the surface contact between the supply roll 90 and the distributer roll 89. This adjustment is effected by means of hand operated screw rods 91$^b$ each of which has a threaded connection with a part of the adjustable bearings 91, as more clearly shown in Figs. 1, 3 and 5.

When it is desired to remove the various rolls of the glue applying mechanism, the auxiliary frame is lowered by the screw mechanism heretofore described whereupon the glue-applying rolls 72 and 73 may be lifted from their open bearings 74 after which the supply roll 90 may be moved outward away from the distributer roll 89 by means of the screw rods 91ᵇ. This will permit removal of the supply roll from its bearings after which the glue tank 92 may be bodily removed from its supported position.

The various rolls of the glue-applying mechanism are preferably driven directly from the blank-supporting platen 22 by gearing more clearly shown in Fig. 4, wherein it will be seen that the blank-supporting platen carries a gear 95 which meshes with gear 96 secured to the shaft of the glue-applying roll 73, said gear 96 being also in mesh with a gear 97 on the shaft of the distributer roll 89. The shaft of the distributer roll 89 is provided with a gear 98 adjacent the gear 97 that meshes with a gear 99 fixed on the shaft of the supply roll 90 by which the latter is driven, all as more clearly shown in Fig. 4. The shaft of the other glue applying roll 72 is provided with a gear 96ª intermeshed with a gear 98ª on the shaft of the distributer roll 89, and from which the said glue applying roll derives its motion.

The feed rolls 51 and 52 are driven from a gear 100 mounted upon the opposite end of the shaft upon which the distributer roll is mounted, said gear 100 meshing with a gear 101 which in turn drives gear 102 on the end of the shaft of the feed roll 51, the feed roll 52 being driven by frictional contact with the roll 51, or if desired, these rolls may be intergeared.

The blank-supporting platen 22 is preferably provided on its surface with a flexible blanket 103, one end of the blanket being securely held by means of a clamp bar 104 adjacent an edge of the cutaway portion of the platen, as more clearly shown in Figs. 7 to 10 inclusive, and the other end of the blanket being wound about a tightener roll 105 journaled in the ends of the platen such roll being provided with a ratchet 106 with which a pawl 107 coöperates to hold the roll 105 against movement when the blanket has been drawn taut about the periphery of the platen. Secured in any suitable manner to the face of the blanket 103 is a raised blank-supporting form 108 as more clearly shown in Fig. 2, which form takes the shape of the wrapper blank to which the adhesive coating is to be applied. By providing the raised form the blanks which are supported thereby during the gluing operation are held away from other portions of the surface of the platen not covered by the form, so that no glue can be applied to such other portions of the platen during rotation of the platen when the machine is in operation. We have found that it is a matter of considerable advantage and convenience to support the raised form so that it may be readily removed from the platen, over such constructions wherein the forms are attached to the surface of the platen by adhesive, in that when a removable form is used the surface of the platen will always remain clean and furthermore the forms may be readily removed and again replaced as often as desired.

The blank-supporting platen is provided with a plurality of gripper fingers 109 each being longitudinally adjustable upon a shaft 110 extending transversely between the end plates of the platen. These gripper fingers are brought into and out of gripping action with the forward edge of the cutaway portion of the platen by means of a gear segment 112 which meshes with a gear 113 secured to the gripper shaft 110. The gear segment is operated by any suitable means as by a cam groove shown in dotted lines in Fig. 7 to cause the gripper fingers 109 to lie wholly below the surface of the platen as the fingers approach the first glue-applying roll 72 so that the fingers will not make contact or their free movement be interfered with by said roll. Immediately however the fingers reach a point just beyond the axis of the first glue-applying roll 72, then the segment 112 will be operated to cause the gripper fingers to move to gripping position and thus grip the blank that has been fed thereto by the feed rolls 51 and 52, all as more clearly shown in Fig. 7. The blank being thus initially gripped at a point between the two glue-applying rolls will then be drawn over both of said rolls, the projecting portions of the grippers passing in the spaces between the faces of the second glue-applying roll 73 as shown in Fig. 10, and carried upward and its direction of movement reversed so to speak, so that the forward end of the blank will be moved in the general direction of the wrapper applying instrumentalities, with the upper or outer face of the blank coated with adhesive. When that part of the platen which carries the gripper fingers approaches the highest point in its travel as illustrated in Fig. 8, the segment 112 is again operated to lift the gripper fingers slightly. At this moment a blank-end lifting device, which is shown in the form of a plate 114 having a hook or hooks 115 at its upper end and which overlies the surface of the platen and upon which the blank rests, is also moved so as to lift the hooks 115 and the overlying end of the blank away from the surface of the platen to permit the entrance under said lifted end of the blank of a thin stationary gripper member 116 of a reciprocating carriage, and with which member 116 a gripper finger 117 coöperates. The plate 114 of which there may be one for each gripper 109 is or are adjustably mounted upon a square bar 118 mounted upon arms 119 secured to a rock shaft 120, the said shaft carrying an arm 121 having a roller 122 at one end thereof which roller is adapted to ride over a suitable cam surface shown in dotted lines in Fig. 7, arranged in the travel path of the roller to cause the blank end lifters to move outward and then inward at proper times to function as described, it being understood that the blank will be gripped between the gripper fingers 109 and the lifters 114, during the lifting movement of the latter and will remain gripped therebetween until the grippers of the blank transporting carriage take hold, as will presently appear.

A yielding strip or strand 109ª is secured at one end to the hub of each gripper finger, its free end projecting freely through an opening in the end of the finger as shown in Fig. 10. The purpose of the strip or strand is to serve as a stop for the forward edge of the blank as it is fed onward by the feed rolls 51 and 52 toward the grippers, thus insuring a perfect register of the blanks with the edge of the platen, as more clearly shown in Fig. 10.

The two members 116 and 117 of the blank transporting grippers are carried by arms 123 attached to and projecting forward from a reciprocating carriage 124 having rollers 125 which travel upon tracks 126. The stationary member 116 of each of the blank transporting grippers is secured to the free end of an arm 123 while the pivoted members 117 are pivoted to said arms. Gripping action may be imparted to the pivoted gripper fingers 117 by any suitable means, such as of rods 127 connected by links 128 to the arms 123. The arms 123 are adjustable laterally toward and from each other upon the carriage 124 by means of bolts and nuts 129, the top plate of the carriage 124 being slotted longitudinally to permit adjustment of the arms as described in order that the grippers 116, 117 may be positioned relative to each other to accommodate blanks of different sizes.

The carriage 124 is positively reciprocated toward and from the box wrapping or covering instrumentalities in order to cause the grippers to transport the gummed blanks from the blank supporting platen to proper registered position over the platen 2 of the box covering machine or to an accurately registered position between the platen 2 and the box form or plunger 3. Mechanism is provided for releasing the gripping action of the movable fingers 117 of the grippers at just about the moment the box shell to be covered or the package to have the wrapper applied thereto, is brought into applying position over the body portion of the wrapper blank.

The blank transporting carriage may be reciprocated by any preferred form of mechanism. In the present instance we have shown the carriage as provided with a rack bar 130 with which a reversely operated gear 131 meshes, as more clearly shown in Fig. 1. The reverse gear is driven by intermeshing bevel gears 132 one of which is mounted upon a vertical shaft 133, said shaft having at its lower end a gear 134 meshing with a larger gear 135, such larger gear carrying a pinion 136 meshing with an oscillating rack segment 137 which latter has an arm 138 secured thereto carrying a roller 139 which runs in a cam groove 140 of the drum 71. It will be apparent that rotation of the drum 71 will impart oscillating movements to the segment 137 which, through the driving connections described, will cause the gear 131 to impart reciprocating movements to the rack 130 and therefore to the carriage forming a part of the blank transporting mechanism described.

The pivoted gripper fingers 117 may be lifted away from the fixed finger 116 when these fingers arrive in blank receiving position adjacent the blank supporting platen, by any suitable means. In the instance shown we have provided the arm 128 to which the rod 127 is pivoted with a depending portion 141, the curved lower end of which is adapted to ride upon a fixed inclined face 142 properly positioned so that the fingers will open when they reach the blank receiving position, as more clearly shown in Fig. 1, and will close immediately the carriage starts to move forward and will thus grip the blank while it is still on the platen and transport it forward as hereinbefore described. When the carriage with its blank reaches the depositing position, or that position where a portion of the blank is properly centered or positioned over the platen 2, the grippers 116, 117 will again be separated to release the blank, this separation being effected by the part 141 again coming into contact with an adjustably mounted cam 142ª, carried by the cam disk 148 secured to shaft 35, thus releasing the blank at the proper time and place. The cam 142ª is adjustably mounted in order that the moment of release of the gripper fingers may be changed to suit blanks of different sizes.

We have provided means for imparting an initial advancing movement to the wrapper-blank transporting carriage and its grippers, directly from the blank-supporting platen during rotation thereof, in order to provide for accuracy and uniformity in the gripping action of the grippers upon the blanks as they are delivered by the platen to thereby insure a more perfect register of the blanks at the point of delivery.

One manner of accomplishing this is more clearly shown in Figs. 8 and 9 of the drawings, wherein it will be seen that the gripper member 116 of the wrapper transporting carriage is provided with a downwardly extending pin or projection 116ª which is arranged to be engaged by an edge of the cut-away portion of the blank-supporting platen when the latter reaches the position shown in Fig. 8. In reaching this position the grippers 116 and 117 of the blank-supporting carriage are supposed to be in the position shown in said figure wherein the grippers are just grasping the forward edge of the blank which is still on the platen.

The platen continuing to move engages the pin or projection 116ª and imparts an initial forward movement thereto operating to initially advance the carriage. Such initial movement is possible because there is necessarily more or less lost motion in the gearing and other connections heretofore described for imparting the back and forth movements to the carriage. By giving the initial advance movement to the carriage through the medium of the blank-supporting platen itself, the adhesively coated wrapper-blanks are always gripped at the same point because the projection 116ª insures this and a more accurate register is secured when the blanks are deposited upon the platen 2 of the wrapper-applying instrumentalities.

We have also found that it is desirable to provide some means to absorb the shock of the blank-supporting carriage when it reaches its blank delivery position and to also provide means for insuring stoppage of the carriage always at a certain definite point in order to secure proper registration of the blank with the platen 2 of wrapper-applying instrumentalities.

To secure this result we have provided a combined buffer and stop for the carriage, this member being more clearly shown in Figs. 1, 11, 12 and 13, to which we will now refer. In said figures the reference numeral 155 designates a track bar adjustably supported at one end in a manner presently to be described and yieldably supported at its other end upon a coiled spring 156, said spring being in turn supported upon a part of the machine frame. The track bar 155 is provided intermediate its ends with a seat in the form of a depression 157 into which a roller 158 carried by a part of the blank-transporting carriage comes to rest when the carriage reaches the limit of its delivery position, or the position in which it is supposed to be when the gummed blank is properly positioned over the platen 2 of the wrapper-applying instrumentalities. That part of the track-bar from the depression 157 toward the spring supported end thereof is gradually inclined outwardly and the track-bar is disposed directly below one of the tracks 126, all as more clearly shown in Figs. 11 and 12, so that as the carriage approaches the limit of its delivery position, the roller 158 will engage the track-bar, which together with the track 126 above it exert a friction action on the roller serving as a buffer to absorb the shock of the carriage which would otherwise result when coming to a stop, if no buffer means were provided.

Means are provided for adjusting the track bar 155 both vertically and longitudinally. To accomplish this, the track bar is provided at its pivotal end with a transverse slot 159, in which there is mounted for sliding but not rotating movement, a nut 160, said nut being provided with oppositely extending pins 161, which project into elongated slots 162 formed in a bracket member 163, which bracket member is secured to and depends from the track 126. An adjusting screw 164 passes loosely through an opening 165, Fig. 13, in the end of the track-bar and the threaded portion of such screw is in threaded engagement with the nut 160. Any suitable means, such as a milled head 166 may be provided for rotating the screw 164. The end of the screw bears against an end wall of the slot 159 in the track bar.

Obviously by turning the screw 164 in one direction or the other, the track-bar 155 may be moved back and forth in the direction of its length to vary the position of the seat 157 in order to effect the final adjustment of the delivery position of the carriage. When properly adjusted, the parts may be locked by a lock nut 167, more clearly shown in Figs. 11 and 13.

The means for adjusting the track-bar vertically, consists of a screw 168 which is tapped through the lower end of the bracket member 163, the end of the screw bearing against the under side of the pivotal end of the track-bar. The screw 168 in the instance shown is provided with a milled head 169 and a lock nut 170 by which it may be adjusted and locked as desired. By adjusting the track bar vertically it will be seen that the buffer action thereof upon the roller 158, may be regulated as desired.

In Figs. 14, 15 and 16, we have shown a form of driving means for the glue-applying mechanism whereby the glue-applying rolls of the latter may be continuously driven while the remainder of the machine is at rest, this being one of the stated objects of the invention. Obviously, this may be accomplished in various ways, and the showing here made is merely by way of illustration.

Instead of driving the glue-applying rolls 72 and 73 by means of a gear such as 95 rotating with the blank-supporting platen as heretofore described, these rolls may be driven directly from the loose driving pulley of the machine as more clearly shown in Figs. 14 and 15. In these figures the reference numeral 171 designates the loose belt-driven pulley through which power is communicated by means of the worm 172 and worm wheel 173 to the main power shaft 35 of the wrapper applying instrumentalities, any suitable form of clutch 171ª being provided between the pulley and the shaft on which the worm 172 is mounted, and the clutch being operable by any suitable means. The loose pulley 171 is provided with a gear 174 which meshes with a pinion 175 carried by a transverse shaft 176 which in turn, through the medium of beveled gears 177 and 178, drive shaft 179 which extends longitudinally of the machine back to the glue-applying mechanism. Splined for movement on shaft 179 is a worm 180 which meshes with a worm wheel 181 mounted upon a sleeve 182 splined for movement upon a vertically extending shaft 183, said shaft being supported in any adjustable position to which it may be set by means of a bifurcated extension 184 of the vertically adjustable auxiliary frame 1ᵇ. The shaft 183 carries at its upper end a beveled gear 185 which in turn meshes with a similar beveled gear 186 carried by an extension of the shaft 76 on which the distributer roll of the glue-applying mechanism is mounted and by which said roll is driven from the loose pulley 171 through the train of gearing mentioned. The various other glue-applying rolls of the gluing mechanism are driven by the gearing heretofore described.

By the arrangement shown and described it will be seen that the glue-applying mechanism is driven directly from the main driving pulley of the machine, whereas the rest of the machine is driven from the worm 172 and worm wheel 173. When, however, the clutch 171ª is disengaged from the driving pulley 171, all the various departments of the whole machine, except the glue-applying mechanism will come to rest and so remain until the clutch is again thrown into operation.

By providing some such mechanism as that described for continuing the operation of the various glue-applying rolls when the other departments of the machine are at rest there will be no opportunity for the glue to become hard upon the rolls, which is an advantage of considerable importance. If desired, a clutch may be interposed between the gear 175 and shaft 176, or at any other suitable point in the train, in order that the glue applying mechanism may be caused to remain at rest while the other departments are in operation. This is sometimes desirable, as when testing out the machine, etc.

It will be seen by referring to Fig. 3 that the table for supporting the pack of blanks is located at a point between the glue-applying mechanism and the wrapper applying instrumentalities and that the arrangement is such that as the blanks are fed successively from the table to the glue applying mechanism, they will be directed reversely by the blank supporting platen which rotates in the direction of the arrow, Fig. 3, so that after having a surface coating of glue applied thereto the blanks will be carried in the general direction of the wrapper applying instrumentalities with the adhesively coated face arranged uppermost. This relative arrangement of the various parts, namely, the particular location of the wrapper selecting and feeding means at a point between the glue applying mechanism and the wrapper applying instrumentalities, we consider to be an important feature of the invention because the arrangement or location of the parts not only shortens up the machine thus saving floor space, but as the blank supporting platen rotates in the general direction of the wrapper applying instrumentalities, the gummed blanks supported thereby are delivered immediately after being gummed, and during substantially a half rotation of the platen, with their forward edges in position to be taken by the grippers of the blank transporting carriage and delivered to the wrapper applying instrumentalities rapidly and accurately.

When our improved blank feeding, gumming and transporting mechanism is associated with a box covering machine wherein an adhesively coated blank is applied to the exterior walls of a box by the mechanism such as herein shown, it is desirable to provide means for ejecting the completely covered box from the machine. One form of means for ejecting the finished boxes is shown in Fig. 2 as consisting of a reciprocating ejector rod 145 arranged to be projected against the finished box which in the form of machine shown remains on the platen 2 after having been covered. The ejector rod is projected toward the box by means of a spring 146 coiled about the rod, the spring being retained under compression by means of a bell crank lever 147, pivoted at one end to the ejector and having an upstanding pin at its other end carrying a roller 149, normally in engagement with the periphery of a rotating disk 148ª mounted upon the shaft 35, the disk having a cut out portion 148ᵇ, Fig. 2. During the travel of the disk the roller 149, riding over the periphery thereof, maintains the ejector rod retracted and the spring under tension. When the cut out portion 148ᵇ in the disk comes opposite the roller 149 on the bell crank lever, the latter is permitted to rock on its pivot and under the power stored up in the spring the ejector will be forcibly projected to eject the finished box from off the platen 2.

The operation of the completely organized machine herein shown and described is as follows:

A pack of wrapper blanks is first placed upon the blank supporting table of the wrapper feeding means and the machine is then set in operation.

The individual blanks of the pack are selected by the automatic feeding means and fed forward successively between the feed rolls 51 and 52 which in turn feed the blanks between the bight of the first one of the pair of glue-applying rollers and the periphery of the blank-supporting platen. Immediately one of the gripper fingers 109 reaches a point just beyond the glue-applying faces of the first glue-applying roller, said finger swings outward and over into gripping engagement with the forward edge of the blank and during the continued rotation of the platen the blank is drawn over both of the glue-applying rollers, the gripper fingers being so arranged as to pass through the spaces separating the faces of the second glue-applying roller. Continued onward movement of the platen carries the blank in the general direction of the box or package covering instrumentalities, the blank receiving a surface coating of adhesive as it is drawn over the two glue-applying rollers 72 and 73.

When the gripper fingers of the platen reach the highest point in their movement, or just prior to reaching such point they move upward and at about the same time the blank end lifting device or devices also move upward to lift the forward end of the blank away from the platen as shown in Fig. 8. In the meantime the fixed member 116 of the blank transporting grippers will have been moved to a position under the lifted end of the blank whereupon the pivoted finger 117 will be caused to grip the blank, and the gripper finger 109 at the same time releasing its hold on the blank. The blank transporting device then carries the adhesively coated blank over to and deposits it upon the platen 2 of the wrapper applying instrumentalities. In the meantime an operator has placed a box or package to be covered or wrapped between the member 10 of the automatic box feeding means and this feeding means is then moved forward by the mechanism described to automatically place a box upon the box form 3. The form with the box thereon then moves down and causes the bottom of the box to be accurately centered in registered position upon the body portion of the blank. The gripper fingers of the blank transporting device release the blank at about the moment the box or package is brought into contact therewith and the carriage is then moved back to receive a fresh blank, which, during the operations last described, has had a coating of glue applied thereto and brought to position to be gripped by the transporting device.

The box to be wrapped is carried through the wrapper applying instrumentalities, then brought back to initial position where it is automatically ejected from the machine by any suitable form of ejector, whereupon a new blank and box or package will be fed into the machine as before.

These operations are carried on successively and automatically. The operations described in so far as they pertain to the wrapper applying instrumentalities refer more particularly to an automatic machine for applying adhesively coated wrapper blanks to open box shells. If the wrapper applying instrumentalities are constructed to apply wrapper blanks about all the walls of a filled package, as in the manufacture of what is known as "tight wrapped packages", there may be slight variations in the sequence of wrapper applying operations described.

We do not claim herein the novel features of the wrapper feeding and gumming mechanism *per se*, except as such or similar mechanisms may be employed in the claimed combination of coöperating parts, the said feeding and gumming mechanism forming the subject matter of our co-pending divisional application, Serial No. 207,684, filed December 18, 1917.

We do not wish to be understood as limiting ourselves to the use of all the various mechanisms for feeding, gumming and transporting the wrapper blanks in the particular combination in which they are shown, as obviously one or more of these mechanisms may be otherwise associated without departing from the spirit of the invention.

What we claim is:

1. In organized mechanism of the class described, and in combination, instrumentalities for applying a wrapper blank to a box or package, and mechanisms operating in timed relation therewith for automatically selecting, feeding, gumming and transporting individual wrapper blanks to said instrumentalities, the said wrapper selecting and feeding mechanism being located at a point between the gumming mechanism and wrapper applying instrumentalities, whereby a more compact organization is obtained, and said transporting mechanism including a gripper for conveying gummed blanks from the gumming means to the said wrapper blank applying instrumentalities in position to have the wrapper blanks applied to boxes or packages.

2. In organized mechanism of the class described, and in combination, instrumentalities for applying an adhesively coated wrapper blank to a box or package, and mechanisms operating in timed relation therewith for automatically feeding, gumming and transporting individual wrapper blanks to said instrumentalities, said gumming mechanism including a blank-supporting platen and adhesive applying rolls coöperatively associated therewith, and said transporting mechanism including a reciprocating gripper for transporting the adhesively coated blanks from the platen to the said instrumentalities for applying the blanks to boxes or packages, the said wrapper selecting and feeding mechanisms being located between the wrapper-applying instrumentalities and gumming mechanism, and below the path of travel of the reciprocating gripper.

3. In organized mechanism of the class described, and in combination, instrumentalities for applying wrapper blanks to boxes or packages and mechanisms operating in timed relation therewith for automatically selecting, feeding, gumming and transporting individual wrapper blanks to said instrumentalities, said gumming mechanism including a rotary blank supporting platen and a pair of glue-applying rollers each having spaced glue-applying faces coöperatively associated with the platen, and said transporting mechanism including a reciprocating gripper for transporting the adhesively coated blanks from the platen to the blank applying instrumentalities, the said wrapper-selecting and feeding mechanisms being located between the applying instrumentalities and the gumming mechanism and below the platen.

4. In organized mechanism of the class described, and in combination, instrumentalities for applying a wrapper blank to a box or package, and mechanisms operating in timed relation therewith for automatically feeding, gumming and transporting individual wrapper blanks to said instrumentalities, said gumming mechanism including a platen and glue-applying rollers associated therewith, said blank feeding means being located at a point between the glue-applying means and the wrapper applying instrumentalities, and said transporting mechanism including a reciprocating gripper for transporting the adhesively coated blanks from the platen to the wrapper applying instrumentalities.

5. In an organized machine of the class described and in combination, a main frame, wrapper blank applying instrumentalities supported therefrom, a wrapper-blank feeding, gumming and transporting unit including a supplemental frame associated with said main frame and its instrumentalities, a carrier frame supporting said wrapper-blank feeding, gumming and transporting mechanisms, and means for bodily adjusting the carrier frame on the supplemental frame in directions toward and from the said instrumentalities.

6. In an organized machine of the class described and in combination, a main frame, wrapper-applying instrumentalities supported therefrom, a supplemental frame, wrapper feeding, gumming and transporting mechanisms supported therefrom, a carrier frame upon which said mechanisms are mounted, and means for permitting adjustment of said carrier frame on the supplemental frame in directions toward and from the said instrumentalities.

7. The combination with any wrapper applying mechanism, of a supplemental frame associated therewith, a carrier frame mounted upon the supplemental frame for adjustment toward and from the wrapper applying mechanism, a rotary blank supporting platen journaled in the carrier frame, an auxiliary frame mounted for vertical adjustment on the carrier frame, glue-applying mechanism supported by the said auxiliary frame, and a reciprocating transporting device movable back and forth between the platen and the wrapper applying mechanism.

8. The combination with any wrapper applying machine, of a supplemental frame associated therewith, a carrier frame supported by the supplemental frame, means for adjusting the carrier frame toward and from the wrapper applying machine, a blank supporting platen journaled in the carrier frame, an auxiliary frame supported for vertical adjustment upon the carrier frame, automatic blank feeding means and glue-applying means both supported by the auxiliary frame, means for bodily adjusting the auxiliary frame in directions toward and from the platen, and a reciprocating wrapper transporting means movable back and forth between the platen and the wrapper applying machine.

9. In an organized machine of the class described and in combination, wrapper applying instrumentalities, wrapper feeding, gumming and transporting mechanisms associated therewith and including a main frame, a carrier frame adjustable longitudinally thereupon, a wrapper supporting platen journaled for rotation in the carrier frame, an auxiliary frame mounted for vertical adjustment upon the carrier frame, wrapper feeding means and gumming means mounted upon the auxiliary frame, means for adjusting the auxiliary frame vertically toward and from the platen, and a reciprocating wrapper-transporting device coöperatively associated with the platen for taking the wrappers therefrom successively and for transporting them to the wrapper-applying instrumentalities.

10. In an organized machine of the class described, and in combination, instrumentalities for applying wrapper blanks to boxes or packages and mechanisms operating in timed relation therewith for automatically gumming and transporting individual wrapper blanks to said instrumentalities, said gumming mechanism including a rotary blank-supporting platen, and said transporting mechanism including a reciprocating gripper for transporting the adhesively coated blanks from the platen to the blank-applying instrumentalities, and means for causing an initial advancing movement of the reciprocating gripper by the action of the platen thereupon.

11. In a machine of the class described, and in combination, instrumentalities for applying wrapper blanks to boxes or packages, and mechanisms operating in timed relation therewith for automatically gumming and transporting individual wrapper blanks to said instrumentalities, said gumming mechanism including a rotary blank-supporting platen, and said transporting mechanism including a reciprocating carriage having grippers for transporting the adhesively coated blanks from the platen to the blank-applying instrumentalities and positive operating means for the carriage, and means independent of said positive operating means for imparting an initial feeding movement to the carriage and its grippers by the action of the platen directly thereupon.

12. In a machine of the class described, and in combination, instrumentalities for applying wrapper-blanks to boxes or packages and mechanisms operating in timed relation therewith for gumming and transporting individual wrapper blanks to said instrumentalities, said transporting mechanism including a reciprocating carriage having grippers for transporting the adhesively coated blanks to the blank-applying instrumentalities, and a yieldable buffer arranged to be engaged by the carriage at the limit of its delivery movement to absorb shocks.

13. In a machine of the class described, and in combination, instrumentalities for applying wrapper-blanks to boxes or packages and mechanisms operating in timed relation therewith for gumming and transporting individual wrapper blanks to said instrumentalities, said transporting mechanism including a reciprocating carriage having grippers for transporting the adhesively coated blanks to the blank-applying instrumentalities, and a combined buffer and stop arranged to be engaged by the carriage at the limit of its delivery movement to insure proper registered positioning of the blanks.

14. In an organized machine of the class described, and in combination, instrumentalities for applying wrapper-blanks to boxes or packages and mechanisms operating in timed relation therewith for gumming and transporting individual wrapper blanks to said instrumentalities, said transporting mechanism including a reciprocating carriage and grippers, a track upon which the carriage is supported during its movements, and a combined buffer and stop for the carriage including a yieldably supported track-bar with which a portion of the carriage engages when it reaches its delivery position.

15. In a machine of the class described, and in combination, wrapper applying instrumentalities, adhesive applying mechanism including a wrapper supporting platen and coöperative adhesive applying rolls, a wrapper transporting device including a reciprocating carriage for transporting the adhesively coated wrapper from the adhesive applying mechanism to the wrapper applying instrumentalities, a roller on the carriage, and a buffer-stop for the carriage including a track bar arranged for engagement by the roller, said track bar having a seat or depression therein for the roller.

16. In a machine of the class described, and in combination, wrapper applying instrumentalities, adhesive applying mechanism including a wrapper supporting platen and coöperative adhesive applying rolls, a wrapper transporting device including a reciprocating carriage for transporting the adhesively coated wrapper from the adhesive applying mechanism to the wrapper applying instrumentalities, a roller on the carriage, a buffer-stop for the carriage including a track bar arranged for engagement by the roller, said track bar having a seat or depression therein for the roller, and means for yieldably supporting the said track bar.

17. In a machine of the class described, and in combination, wrapper applying instrumentalities, adhesive applying mechanism including a wrapper supporting platen and coöperative adhesive applying rolls, a wrapper transporting device including a reciprocating carriage for transporting the adhesively coated wrapper, a roller on the carriage, a buffer-stop for the carriage including a track-bar arranged for engagement by the roller, and means for adjusting the track-bar longitudinally of its length.

18. In a machine of the class described, and in combination, wrapper applying instrumentalities, adhesive applying mechanism including a wrapper supporting platen and coöperative adhesive applying rolls, a wrapper transporting device including a reciprocating carriage for transporting the adhesively coated wrapper, a roller on the carriage, a buffer-stop for the carriage including a track-bar arranged for engagement by the roller, and means for adjusting the track-bar both vertically and longitudinally.

19. In a machine of the class described, and in combination, instrumentalities for applying a wrapper-blank to a box or package, and mechanisms operating in timed relation therewith for automatically gumming and transporting individual wrapper blanks to said instrumentalities, said gumming mechanism including gumming rolls and a coöperating platen, means for moving the gumming rolls bodily toward and from the platen, and means for imparting rotation to the said gumming rolls when the latter are moved away from the platen, said means being independent of the mechanism for operating the wrapper-applying and transporting mechanisms whereby the gumming rolls may be rotated when the other machine departments are at rest.

20. In an organized machine of the class described, and in combination, instrumentalities for applying an adhesively coated wrapper-blank to a box or package, and mechanisms operating in timed relation therewith for automatically gumming and transporting individual wrapper-blanks to said instrumentalities, said gumming mechanism including a blank-supporting platen and adhesive applying rolls coöperatively associated therewith, said rolls being movable bodily toward and from the platen, and said transporting mechanism including a reciprocating gripper for transporting the adhesively coated blanks from the platen to the said instrumentalities for applying the blanks to the boxes or packages, and mechanism for driving the rolls of the gumming mechanism when said rolls are moved away from the platen.

21. In a machine of the class described, and in combination, wrapper-blank applying instrumentalities, blank gumming and transporting means associated with said instrumentalities, said gumming means including a rotary blank supporting platen, and said transporting means including a reciprocating carriage and grippers, an adjustable frame member upon which said gumming and transporting mechanisms are carried, and means for bodily adjusting the frame member toward and from said blank-applying instrumentalities.

In testimony whereof we affix our signatures in the presence of two witnesses.

JAMES D. REIFSNYDER.
WILLIAM A. WEIGHTMAN.
ERNEST G. RIDER.

Witnesses:
CARL E. SCHAEFFER,
SILAS E. CHILD.